March 11, 1941.  S. L. BROUS  2,234,621
METHOD OF MAKING A COMPOSITE ARTICLE
Filed Nov. 24, 1936
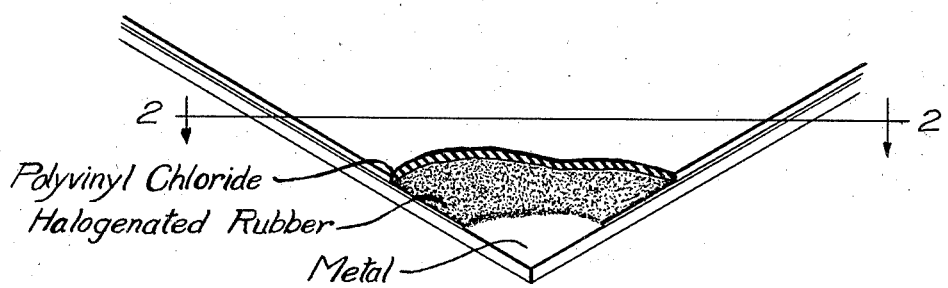
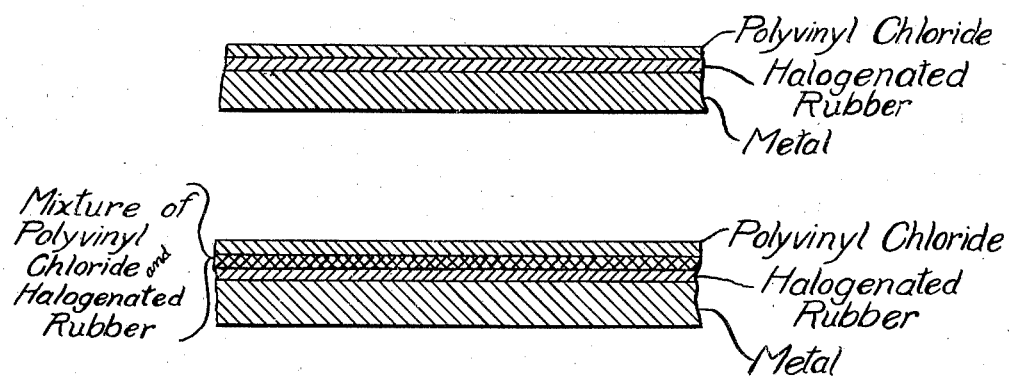
Inventor
Samuel L. Brous
By Willis F. Avery
Atty Patented Mar. 11, 1941

2,234,621

UNITED STATES PATENT OFFICE 2,234,621

METHOD OF MAKING A COMPOSITE ARTICLE

Samuel L. Brous, Akron, Ohio, assignor to The B. F. Goodrich Company, New York, N. Y., a corporation of New York Application November 24, 1936, Serial No. 112,509

3 Claims. (Cl. 154—40)

This invention relates to the manufacture of composite structures, and has for its object the adhesion of polyvinyl chloride to metal and other backing materials.

Heretofore it has been practically impossible to obtain satisfactory adhesion of polyvinyl chloride layers to metal, particularly if the polyvinyl chloride contains enough plasticizer to render it more or less rubbery. The ordinary methods of obtaining adhesion of rubber to metal such as by rubber cements, rubber-isomer cements, and direct adhesion to brass are useless for polyvinyl chloride.

I have discovered that very good adhesion of plasticized polyvinyl chloride films to metal may be obtained by means of halogenated rubber. To illustrate an embodiment of my invention, I will describe the method by which I adhere a polyvinyl chloride film to iron by means of a chlorinated rubber cement.

I prepare a cement containing chlorinated rubber 100 parts and mesityl oxide 570 parts, all parts being by weight throughout this specification. With a brush, I apply three coats of this cement to a sand-blasted iron panel, allowing the cement to dry after each application. I then apply three coats of plasticized polyvinyl chloride containing polyvinyl chloride 100 parts, tricresyl phosphate 25 parts, and mesityl oxide 875 parts, allowing each coat to dry before I apply another. After this construction has dried for six hours, the separate films which I have applied are firmly bound together and the adhesion to the iron is good. Baking in an oven at 70° C. makes the adhesion even better. If I wish to apply a sheet of polyvinyl chloride, I adhere it to the polyvinyl chloride film with another coat of polyvinyl chloride solution. If I wish to adhere a sheet of polyvinyl chloride to the iron without the use of a polyvinyl chloride solution, I coat both the iron and polyvinyl chloride sheet with chlorinated rubber cement, allow to dry, and then adhere the polyvinyl chloride sheet to the iron with another coat of chlorinated rubber cement. I can also adhere polyvinyl chloride to iron by molding the polyvinyl chloride directly to a chlorinated rubber film upon an iron surface in a heated press, and allowing the composite product to cool in the press.

As a modification of this method, I often add resinous materials to the chlorinated rubber. For example, I prepare a cement containing chlorinated rubber 100 parts, glyco ester gum 25 parts, and mesityl oxide 620 parts. I apply one coat of this cement to a sheet of lead whose surface has been brightened with steel wool, and allow it to dry for three hours. I then apply four coats of a mixture of polyvinyl chloride 5 parts and methyl propyl ketone 95 parts, allowing each coat to dry before the next application. The adhesion is excellent, and even after part of the polyvinyl chloride surface has been loosened by flexing the lead, the rest remains firmly adhered and does not peel off.

In another embodiment of my invention, I use a step-off construction, by which I mean applying a coat of chlorinated rubber to the metal followed by coats of mixtures of chlorinated rubber and polyvinyl chloride in which the quantity of chlorinated rubber is successively reduced until none is present. As an example, I coat a piece of sand-blasted iron with three coats of a solution of 100 parts of chlorinated rubber in 330 parts of mesityl oxide, allowing each coat to dry thoroughly before the next coat is applied. I next apply three coats of a mixture of 50 parts of this chlorinated rubber cement mixed with 50 parts of a solution containing 8 parts of polyvinyl chloride, 2 parts of tricresyl phosphate, and 90 parts of mesityl oxide, drying thoroughly after each application. I then apply three coats of the polyvinyl chloride solution, drying after each application. After allowing the construction to dry for several hours, I find that the adhesion is excellent, and that the separate parts are integrally united into a whole.

These embodiments of the invention are further illustrated by the accompanying drawing of which Fig. 1 represents a perspective, partly cut away and in section, illustrating the simplest method of performing the adhesion;

Fig. 2 represents a section taken on line 2—2 of Fig. 1; and

Fig. 3 represents another embodiment of my invention useful when very strong adhesion is desired.

As can be seen by the legends on the drawing, a layer of halogenated rubber bonds polyvinyl chloride to metal in Fig. 1. In Fig. 3, a layer comprising both polyvinyl chloride and halogenated rubber is used to strongly adhere the polyvinyl chloride to the halogenated rubber which, in turn, adheres to the metal.

Though I have disclosed specific embodiments of my invention, it is not limited thereto, but is capable of various modifications within the scope of the appended claims. By means of a halogenated rubber cement, polyvinyl chloride may be adhered to metals, wood, glass, stone or other materials including even rubber compositions. I may use polyvinyl chloride with or without any one of a number of plasticizers such as tricresyl phosphate, butyl phthalyl butyl glycollate, dibutyl phthalate, o-nitro-diphenylether and other substances imparting like qualities to the polyvinyl chloride. It is also within the scope of my invention to add to the polyvinyl chloride different pigments and fillers which are commonly used in the rubber and plastics industries.

This invention is not limited to polyvinyl chloride, but includes other similar polyvinyl resins such as polyvinyl bromide and resinous substances produced by the conjoint polymerization of vinyl chloride with minor proportions of other polymerizable compounds such as vinyl acetate. I wish to include all such materials in the term "polyvinyl halide" used in the appended claims. The term "halogenated rubber cement" is used to include adhesive mixtures comprising principally halogenated rubber and a solvent, whether or not mixed with other materials such as fillers, pigments, and resins such as ester gum. The rubber may be vulcanized before halogenation if desired. Although I prefer to use the ordinary commercial chlorinated rubber which is highly chlorinated and contains in the neighborhood of 65% chlorine, other equivalent halogenated rubbers, of which a considerable variety are now known, may be substituted with satisfactory results.

I claim:

1. The method of adhering polyvinyl chloride to metal which comprises covering the metal with at least one coat of chlorinated rubber cement, prepared from chlorinated rubber containing in the neighborhood of 65% of chlorine, and superposing at least one coat of a solution of polyvinyl chloride.

2. The method of adhering polyvinyl chloride to metal which comprises covering the metal with at least one coat of chlorinated rubber cement prepared from chlorinated rubber containing in the neighborhood of 65% of chlorine, superposing at least one coat of a solution of polyvinyl chloride, and superposing a sheet of polyvinyl chloride.

3. The method of adhering polyvinyl chloride to metal which comprises covering the metal with at least one coat of chlorinated rubber cement prepared from chlorinated rubber containing in the neighborhood of 65% of chlorine, superposing at least one coat of a solution of polyvinyl chloride, and baking the assemblage.

SAMUEL L. BROUS.